W. NIEBUHR.
ANIMAL TRAP.
APPLICATION FILED SEPT. 21, 1912.

1,077,244.

Patented Oct. 28, 1913.

2 SHEETS—SHEET 1.

W. NIEBUHR.
ANIMAL TRAP.
APPLICATION FILED SEPT. 21, 1912.
1,077,244.
Patented Oct. 28, 1913.
2 SHEETS—SHEET 2.
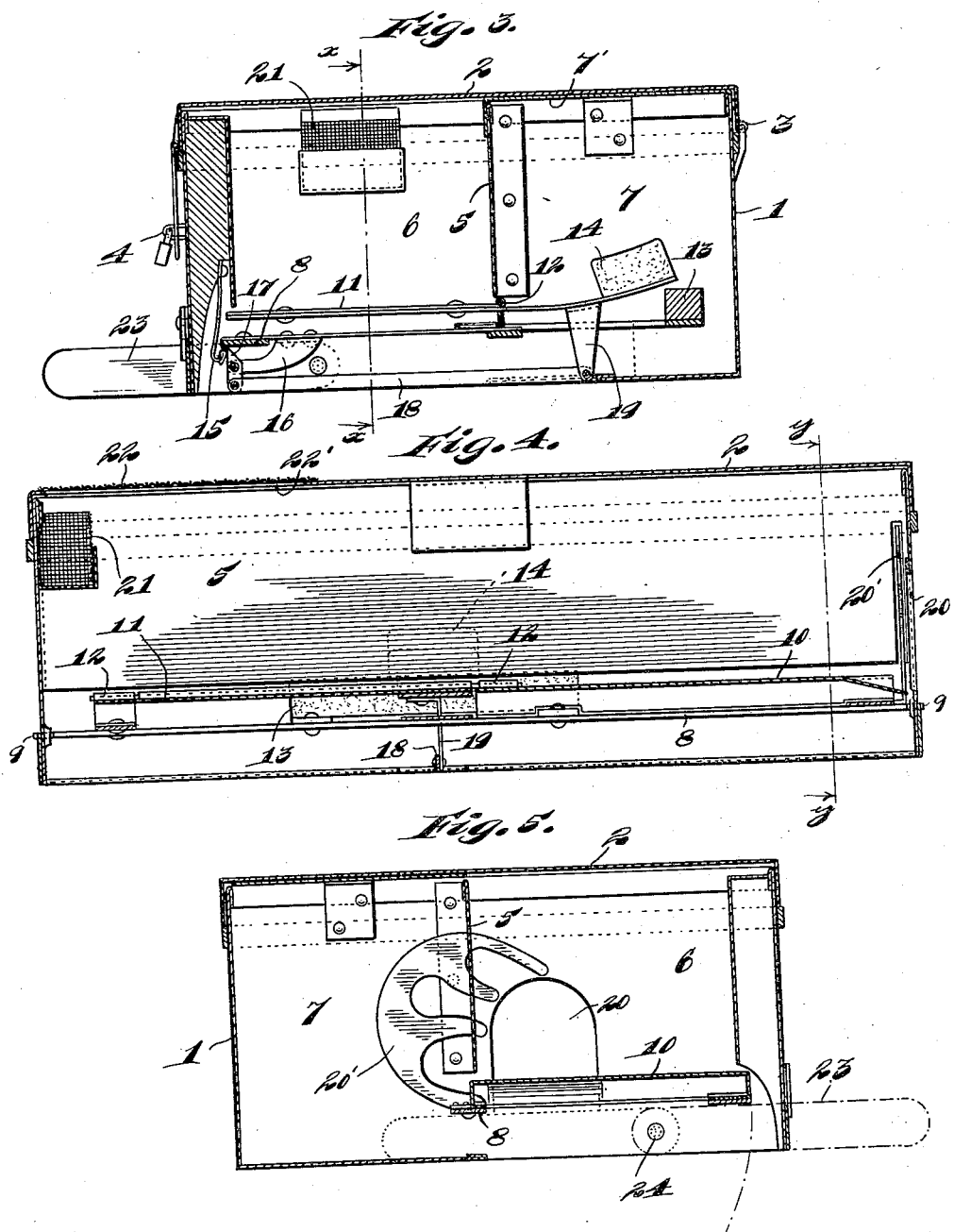

UNITED STATES PATENT OFFICE.

WILHELM NIEBUHR, OF MADISON, WISCONSIN, ASSIGNOR, BY DIRECT AND MESNE ASSIGNMENTS, TO THE NATIONAL TRAP WORKS, OF MADISON, WISCONSIN, A CORPORATION OF WISCONSIN.

ANIMAL-TRAP.

1,077,244.  Specification of Letters Patent.  Patented Oct. 28, 1913.

Application filed September 21, 1912. Serial No. 721,587.

*To all whom it may concern:*

Be it known that I, WILHELM NIEBUHR, a citizen of the United States, and a resident of the city of Madison, county of Dane, and State of Wisconsin, have invented certain new and useful Improvements in Animal-Traps, of which the following is a specification.

My invention relates to improvements in animal traps and more specifically to that class thereof designed for use especially in the trapping of rats and the like.

The object of my invention is the production of a trap of the character mentioned which will be durable and economical in construction and efficient in use.

Other objects will appear hereinafter.

My invention consists of the combinations and arrangements of parts hereinafter described and claimed.

The invention will be best understood by reference to the accompanying drawings forming a part of this specification and in which—

Figure 1:
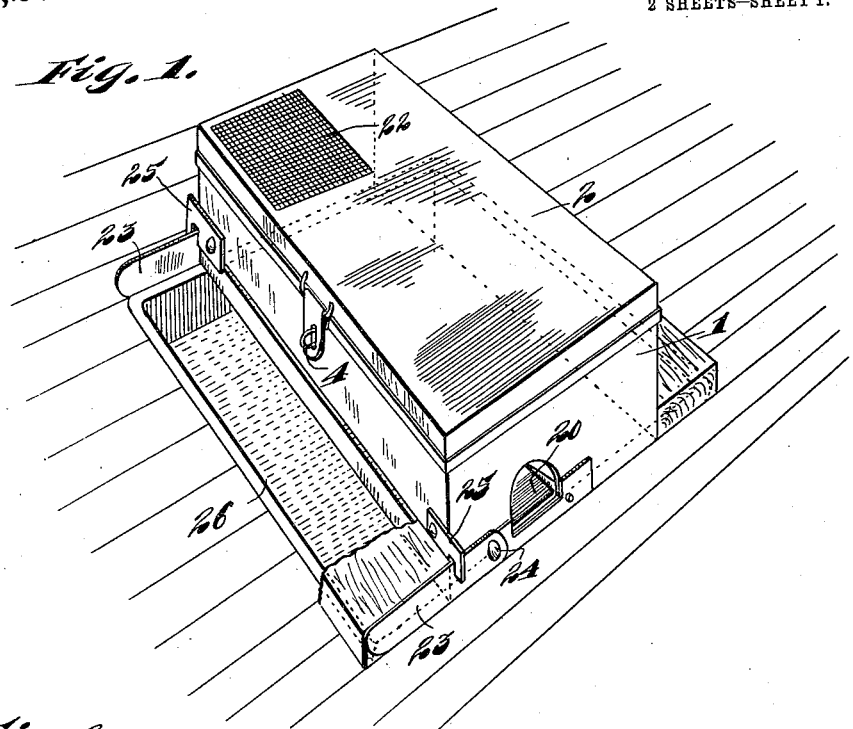
Figure 2:
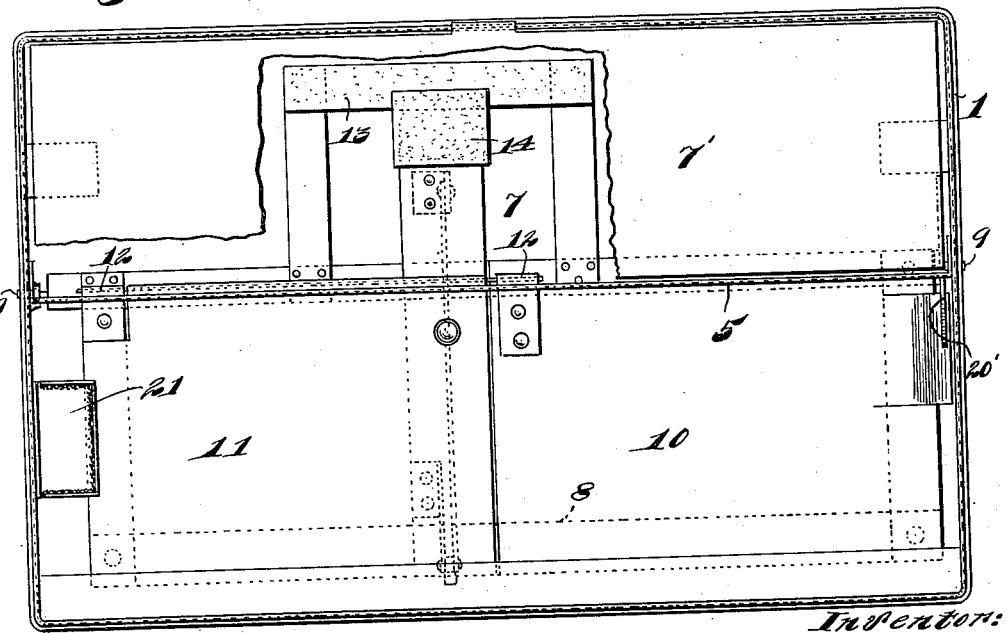

Figure 1 is a perspective view of an animal trap embodying my invention. Fig. 2 is an enlarged partially sectional plan view of the trap, the cover being removed. Fig. 3 is a central vertical transverse section of the device. Fig. 4 is a vertical longitudinal section taken on substantially line x—x of Fig. 3, and Fig. 5 is a vertical transverse section taken on line y—y of Fig. 4.

The preferred form of construction as illustrated in the drawing comprises a hollow rectangular body 1 formed of sheet metal. Said body is open at its upper side and is provided with a cover 2 which is hinged at its rearward end 3. A suitable locking device 4 is provided at the front or free edge of said cover for fastening the latter in closed position.

The interior of the body 1 is divided by means of a vertical longitudinally extending partition 5 into two elongated compartments 6 and 7. The bottom of compartment 6 is of the "trap-door" construction being adapted to be swung downwardly at the proper instant to precipitate the animal which steps thereon in the manner hereinafter described. Said bottom consists of a skeleton or body portion 8 which is rectangular in outline, said body 8 being hingedly secured at 9 so as to permit of the same swinging downwardly. Rigidly secured upon one end of the body member 8 is a relatively stationary floor section or member 10. Provided at the opposite side of the floor body 8 is a floor section 11 one edge of which is hingedly secured at 12 to the member 8 so as to permit of the opposite end of said member 11 swinging downwardly.

The floor member or body 8 is normally held at its upper terminal of movement by means of a counter-balance weight 13, a counter-balance weight 14 coöperating with the floor section 11 in the same manner, said weight members being arranged as shown in the compartment 7 which is provided with a removable cover 7′ to permit of access to said weights for adjustment if found necessary. The floor member 8 is releasably locked in elevated or horizontal position by means of a spring detent 15 which is adapted normally to engage under the free edge of the former, as clearly shown in Fig. 3. Arranged upon the under side of the floor member 8 is an arm 16 upon the outer extremity of which is pivoted a trigger 17 adapted, when properly rocked, to effect tripping of the detent 15 in order to release the floor of compartment 6. The lower end of trigger 17 is connected by means of a link 18 with the lower end of an arm 19 which depends from the under side of the weight arm projecting from the rearward edge of floor member 11. The arrangement is such, that downward swinging or depression of the floor member 11 will effect rocking of the trigger 17 in order to trip the detent 15 so as to permit of free downward swinging of the entire floor member.

Provided at the end of the compartment 6 adjacent the relatively stationary floor member 10 is an entrance opening 20 and provided at the opposite end of said compartment is a bait-holder 21, the cover 2 adjacent the last mentioned end being cut away at 22 and provided with a screen or wire mesh covering 22′ in order to illuminate this end of said compartment. With the arrangement disclosed the animals entering the compartment 6 through the entrance opening 20 will be lured to the other end of said compartment by reason of the bait provided in holder 21 and by reason of the illumination afforded by opening 22. When the animals reach a position upon the floor member 11, the latter, by reason of the weight of the animal thereon, will swing downwardly effecting the release of the entire floor structure which will swing downwardly precipitating the animal into the receptacle upon which the trap is arranged. The floor member 11 at the entrance opening is provided with a closure member 20' adapted, when the floor is swung downwardly, as just mentioned, to close the entrance opening and thus prevent the animal from escaping or the entrance to the trap of another animal before the floor has been returned to normal position by the weights coöperating therewith.

Provided at the ends of body 1 are supporting arms 23 which are pivoted thereto at 24. Coöperating with said arms 22 are stops 25 adapted to maintain said arms in horizontal position in order to adapt the same to support the body in position over the receptacle, as indicated at 26 in Fig. 2. The arms 23 are so arranged that, when the device is not in use, the same may be folded back and so that the device will occupy a minimum of space for storage or shipment. The receptacle 26 preferably contains water so that the animals which are deposited thereinto by reason of the springing of the trap, will be drowned.

A trap of the construction set forth is durable and economical and the same will be found very effective in use.

While I have illustrated and described the preferred form of construction for carrying my invention into effect, this is capable of variation and modification without departing from the spirit of the invention. I, therefore, do not wish to be limited to the precise details set forth, but desire to avail myself of such variations and modifications as come within the scope of the appended claims.

Having described my invention, what I claim as new and desire to secure by Letters Patent is:

An animal trap comprising a body having a compartment accessible through an entrance opening provided at one end thereof; a hinged primary floor member for said compartment, a secondary floor member hingedly mounted upon said primary floor member, a spring detent adapted to normally engage the free edge of said primary floor member to releasably hold the same in horizontal position; means operable through downward swinging of said secondary floor member for tripping said detent, said tripping means comprising a pivoted trigger mounted at the under side of said secondary floor member adapted, when rocked, to move said detent to releasing position; and a link connecting said trigger with the rearward end of said secondary floor member, substantially as described.

In testimony whereof I have signed my name to this specification in the presence of two subscribing witnesses.

WILHELM NIEBUHR.

Witnesses:
 EDWARD HASPEL,
 HENRY FLYNN.

---

Copies of this patent may be obtained for five cents each, by addressing the "Commissioner of Patents, Washington, D. C."